Jan. 31, 1956
S. ROSENFELD
2,733,124
MANUFACTURE OF URANIUM TETRACHLORIDE
Filed Jan. 5, 1944
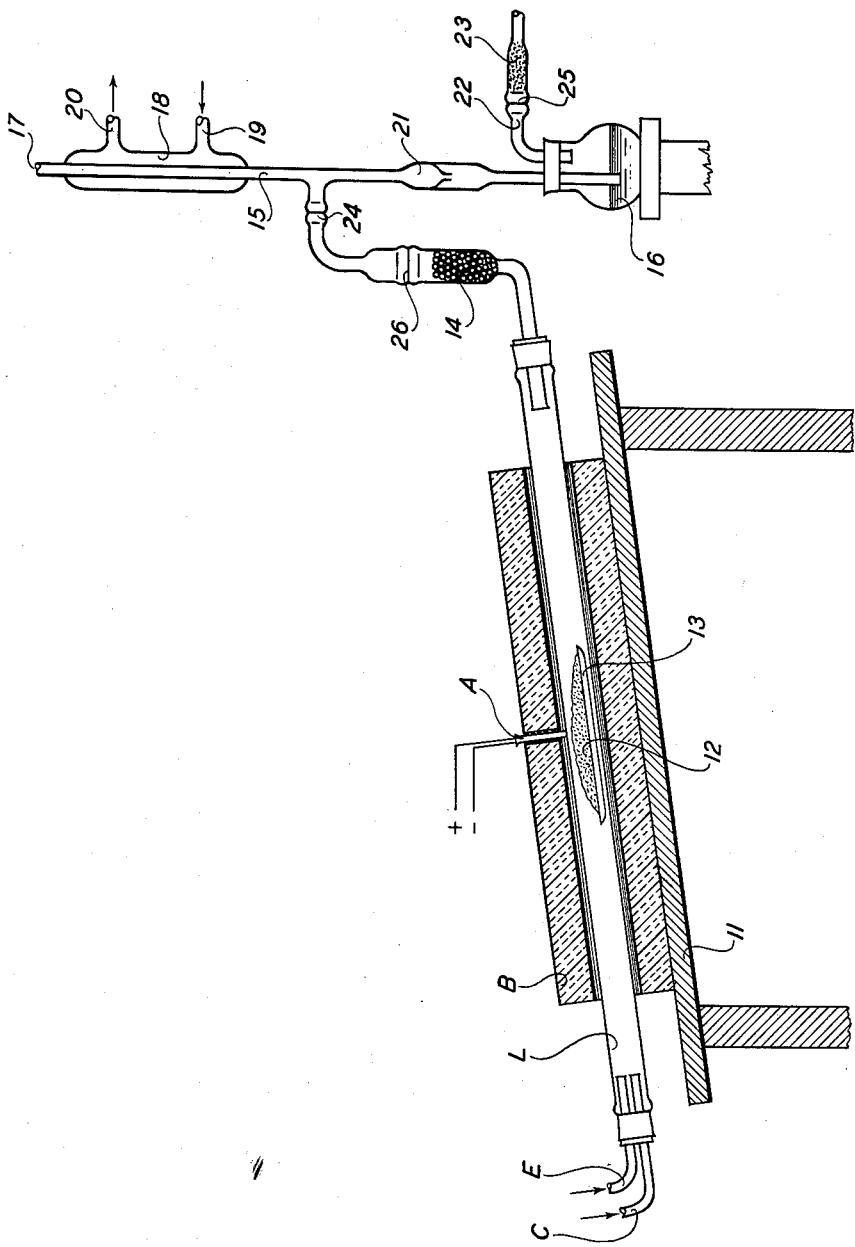
INVENTOR.
Sam Rosenfeld
BY
Robert A. Lavender
ATTORNEY.

2,733,124
MANUFACTURE OF URANIUM TETRACHLORIDE

Sam Rosenfeld, Berkeley, Calif., assignor to the United States of America as represented by the United States Atomic Energy Commission Application January 5, 1944, Serial No. 517,017

7 Claims. (Cl. 23—14.5)

This invention relates to the manufacture of uranium tetrachloride, especially its preparation by a process that averts the concurrent formation of uranium pentachloride. More particularly it appertains to the treatment of uranium oxide with a mixture of carbon tetrachloride and chloroform.

Industry needs large quantities of uranium tetrachloride. The preparation of this substance by treating uranium oxide with carbon tetrachloride was suggested by Camboulives, Compt. Rend. (1910) 150, 175–7. Unfortunately the product of this reaction was uranium tetrachloride contaminated with uranium pentachloride. The removal of this impurity is difficult and uneconomical.

This invention has for an object the preparation of pure uranium tetrachloride by a simple and economical process. Other objects are to convert uranium oxide to uranium tetrachloride without the simultaneous formation of uranium pentachloride, the complete conversion of uranium dioxide to uranium tetrachloride and the production of uranium tetrachloride free from other uranium compounds by treating with a gaseous chlorine containing reagent. Further objects are to produce uranium tetrachloride of high chemical purity in crystalline form, wherein the major portion of the product has a relatively large crystal size, to produce uranium tetrachloride by a process in which the reaction temperature is readily maintained in an optimum range and to produce uranium tetrachloride by a procedure wherein yield-reducing side-reactions are minimized and/or eliminated. A general advance in the art and other objects which will appear hereinafter are also contemplated.

It has now been found that passing a mixture of carbon tetrachloride vapor and chloroform vapor wherein the latter is present in the mixture to the extent of approximately 20 to 30% by weight over uranium oxide maintained at about 450° C. completely or substantially completely converts the oxide to uranium tetrachloride in a desirable crystalline condition.

How the foregoing objects and related ends are accomplished will be apparent from the following exposition in which are disclosed the principle, the organization and divers embodiments of the invention, including the best mode contemplated for carrying out the same. Parts are given by weight throughout the written description which is amplified by the accompanying drawing, the single figure being a diagrammatic side elevational view, partly in section, of an apparatus for carrying out the process of the invention.

Referring now to the drawing there is shown an inclined support or table 11 upon which is located a hollow tubular heater B containing a thermocouple well A, and a cylindrical reaction chamber L, preferably of Pyrex, extending through the heater. In carrying out the process a charge 12 of uranium dioxide in a boat 13 is first placed in the reaction chamber. After sweeping the reaction chamber free of air or other deleterious gases, with an inert gas such as nitrogen or some of the reactant gas, the charge is raised to the desired temperature and a mixture of carbon tetrachloride and chloroform vapors passed thereover. These vapors enter through separate adits C and E and are mixed and preheated in that portion of the reaction chamber through which they pass before contacting the batch of oxide. By using a flash-type boiler the carbon tetrachloride and chloroform may be mixed in the liquid state and vaporized into the reaction chamber simultaneously. The reaction gases and any unreacted chlorinating agent vapors pass out of the reaction chamber through a dust collector 14 comprising a chamber filled with glass wool or small ceramic fragments into a condenser 15. The condensable gases are collected in a receiver 16 for salvage. The non-condensable gases, such as carbon dioxide and carbon monoxide, are vented through a line 17. The condenser 15 has the usual water jacket 18 with inlet 19 and outlet 20. The return line from the condenser includes a drop counter 21 so that there is a visible indication of the utilization of the chlorinating gases. A vent tube 22 containing a body of dehydrating agent 23 is provided for the collector 16. Ground glass joints 24, 25, and 26 are provided to facilitate assembling the apparatus.

Example I

A charge consisting of 1374 parts of commercial uranium dioxide in a tray was placed in a reaction chamber surrounded by a heater. The chamber was flushed with carbon dioxide to drive out air, and the batch of material heated to approximately 450° C. A chlorinating mixture, formed by vaporizing carbon tetrachloride (technical grade) and chloroform (C. P. grade) in the ratio 3:1 (75%–25%), was preheated to prevent lowering the temperature of the reaction mass and passed over the heated charge at substantially atmospheric pressure. The reaction gases, including carbon monoxide, carbon dioxide, phosgene, hydrogen chloride, chlorine, etc., and unreacted carbon tetrachloride and chloroform were allowed to pass out of the reaction chamber through a condenser, which collected the unreacted carbon tetrachloride, chloroform, and dissolved phosgene. The gases not removed by the condenser were passed through scrubbers to vents. Upon completion of the reaction, a yield of about 1894 parts of uranium tetrachloride was obtained.

Example II

The process of Example I was repeated using 600 parts of uranium trioxide instead of the uranium dioxide and heating to 500° C. Like results (yield 784 parts of uranium tetrachloride) were obtained.

Example III

A procedure similar to that of Example I was carried out utilizing a gaseous chlorinating mixture comprising essentially 70% carbon tetrachloride and 30% chloroform. A lower yield of uranium tetrachloride was obtained, but the purity of the product was similar to that of Example I.

Example IV

The Example I procedure was repeated using a chlorinating mixture comprising 95% carbon tetrachloride and 5% chloroform. Approximately 8% of impurities were present in the resulting uranium tetrachloride.

As indicated by the examples, a mixture of carbon tetrachloride and chloroform containing approximately 25% chloroform appears to be the optimum chlorinating agent.

Higher proportions of chloroform tend to form carbon in the reaction product. While this carbon can easily be separated from $UCl_4$ by sublimation of the latter it is preferable to avoid its formation. Smaller proportions of chloroform allow the formation of some $UCl_5$ which tends to clog the exit line and to cause binding of the joints with consequent loss of time in running the process.

While a temperature of 450° C. for the reaction of uranium dioxide is preferred, the range 425° to 475° C. gives good results. If the reaction is carried out at about 400° C. the product is in lumps which are difficult to handle. Temperatures above 500° C. favor the formation of $UCl_5$ which tends to clog the exit lines by condensing therein. Preheating the reactant gases to 500° C. gives beneficial results.

Three to five hours is required to convert uranium dioxide charges of the size utilized in the examples to the tetrachloride. The time factor depends largely upon the proportionate surface of the charge which is exposed. The uranium trioxide reacts more slowly than the dioxide, and a somewhat higher reaction temperature is indicated. The completion of the reaction is indicated by the decrease in consumption of chlorinating agent and decrease in evolution of gases which are not condensed in the apparatus.

Probably many apparently widely different embodiments of this invention may be made without departing from the principle, breadth and spirit thereof and it is to be understood therefore that this invention is not limited to the specific embodiments thereof except as encompassed in the claims.

What is claimed is:

1. The process which comprises contacting a mixture of carbon tetrachloride and chloroform with uranium oxide while maintaining a temperature in the range 400° to 500° C., whereby uranium tetrachloride is produced.

2. The process which comprises contacting a mixture of carbon tetrachloride and chloroform with uranium dioxide while maintaining a temperature in the range 425° to 475° C., whereby uranium tetrachloride is produced.

3. The process which comprises contacting a mixture of carbon tetrachloride and chloroform with uranium dioxide while maintaining a temperature of about 450° C., whereby uranium tetrachloride is produced.

4. The process which comprises contacting a mixture of carbon tetrachloride and chloroform substantially in the proportion 75:25 with uranium dioxide while maintaining a temperature in the range 425° to 475° C., whereby uranium tetrachloride is produced.

5. The process which comprises contacting a mixture of carbon tetrachloride and chloroform substantially in the proportion 75:25 with uranium dioxide while maintaining a temperature of about 450° C., whereby uranium tetrachloride is produced.

6. The process which comprises contacting a mixture of carbon tetrachloride and chloroform with uranium trioxide while maintaining a temperature in the range 425° to 475° C., whereby uranium tetrachloride is produced.

7. The process which comprises contacting a mixture of carbon tetrachloride and chloroform substantially in the proportion 75:25 with uranium trioxide while maintaining a temperature in the range 425° to 475° C., whereby uranium tetrachloride is produced.

No references cited.